(12) United States Patent
Cervenka

(10) Patent No.: US 7,673,380 B2
(45) Date of Patent: Mar. 9, 2010

(54) METHODS FOR MAKING ROTORS FOR PERMANENT MAGNET MOTORS

(75) Inventor: Gregory Paul Cervenka, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 228 days.

(21) Appl. No.: 11/789,040

(22) Filed: Apr. 23, 2007

(65) Prior Publication Data

US 2008/0256784 A1    Oct. 23, 2008

(51) Int. Cl.
*H02K 15/02* (2006.01)
*H02K 15/10* (2006.01)

(52) U.S. Cl. .................. 29/598; 29/609; 310/156.21
(58) Field of Classification Search .............. 29/598, 29/609; 310/156.21
See application file for complete search history.

(56) References Cited

U.S. PATENT DOCUMENTS

| | | | |
|---|---|---|---|
| 3,221,194 A | 11/1965 | Blackburn | |
| 3,531,670 A | 9/1970 | Loudon | |
| 3,727,302 A * | 4/1973 | Phelon | 29/596 |
| 3,858,308 A | 1/1975 | Peterson | 29/598 |
| 4,339,874 A | 7/1982 | McCarty et al. | 29/598 |
| 4,588,915 A | 5/1986 | Gold et al. | 310/194 |
| 4,625,392 A | 12/1986 | Stokes | 29/598 |
| 4,741,094 A * | 5/1988 | Denk et al. | 29/598 |
| 4,841,183 A | 6/1989 | Dohuge et al. | 310/90 |
| 4,910,861 A | 3/1990 | Dohuge | 29/598 |
| 4,959,577 A | 9/1990 | Radomski | 310/263 |
| 5,040,286 A | 8/1991 | Stark | 29/598 |
| 5,578,885 A | 11/1996 | Alford et al. | 310/263 |
| 6,104,115 A * | 8/2000 | Offringa et al. | 310/156.28 |
| 6,324,745 B1 | 12/2001 | Poag et al. | 29/598 |
| 6,481,090 B1 | 11/2002 | Franco et al. | 29/598 |
| 6,703,746 B2 | 3/2004 | Biais et al. | 310/156.53 |
| 6,769,168 B2 * | 8/2004 | Du | 29/597 |
| 7,195,107 B2 | 3/2007 | Gauthier et al. | 187/259 |
| 2003/0052561 A1 | 3/2003 | Rahman et al. | 310/156.56 |
| 2005/0246886 A1 | 11/2005 | Morel | 29/596 |
| 2005/0275302 A1 | 12/2005 | Rahman et al. | 310/156.56 |
| 2006/0097595 A1 | 5/2006 | Randriamanantena | 310/156.08 |
| 2006/0192453 A1 | 8/2006 | Gieras et al. | 310/92 |

FOREIGN PATENT DOCUMENTS

| | | |
|---|---|---|
| DE | 4417093 A1 | 5/1994 |
| DE | 19622262 | 6/1996 |
| EP | 1411620 | 4/2004 |
| EP | 1646126 | 4/2006 |
| JP | 2002078257 | 3/2002 |

* cited by examiner

*Primary Examiner*—Derris H Banks
*Assistant Examiner*—Jeffrey Carley
(74) *Attorney, Agent, or Firm*—Williams, Morgan & Amerson, P.C.

(57) ABSTRACT

A method for making a rotor for a permanent magnet motor, the method, in at least certain aspects, including connecting a series of a plurality of guides to a hollow rotor body, the guides spaced-apart and extending longitudinally of the rotor body, the rotor body being generally cylindrical with an interior surface, applying a plurality of magnets to the interior surface of the rotor body, and emplacing a shunt structure over the plurality of magnets to inhibit inter-magnet action during rotor assembly.

12 Claims, 7 Drawing Sheets

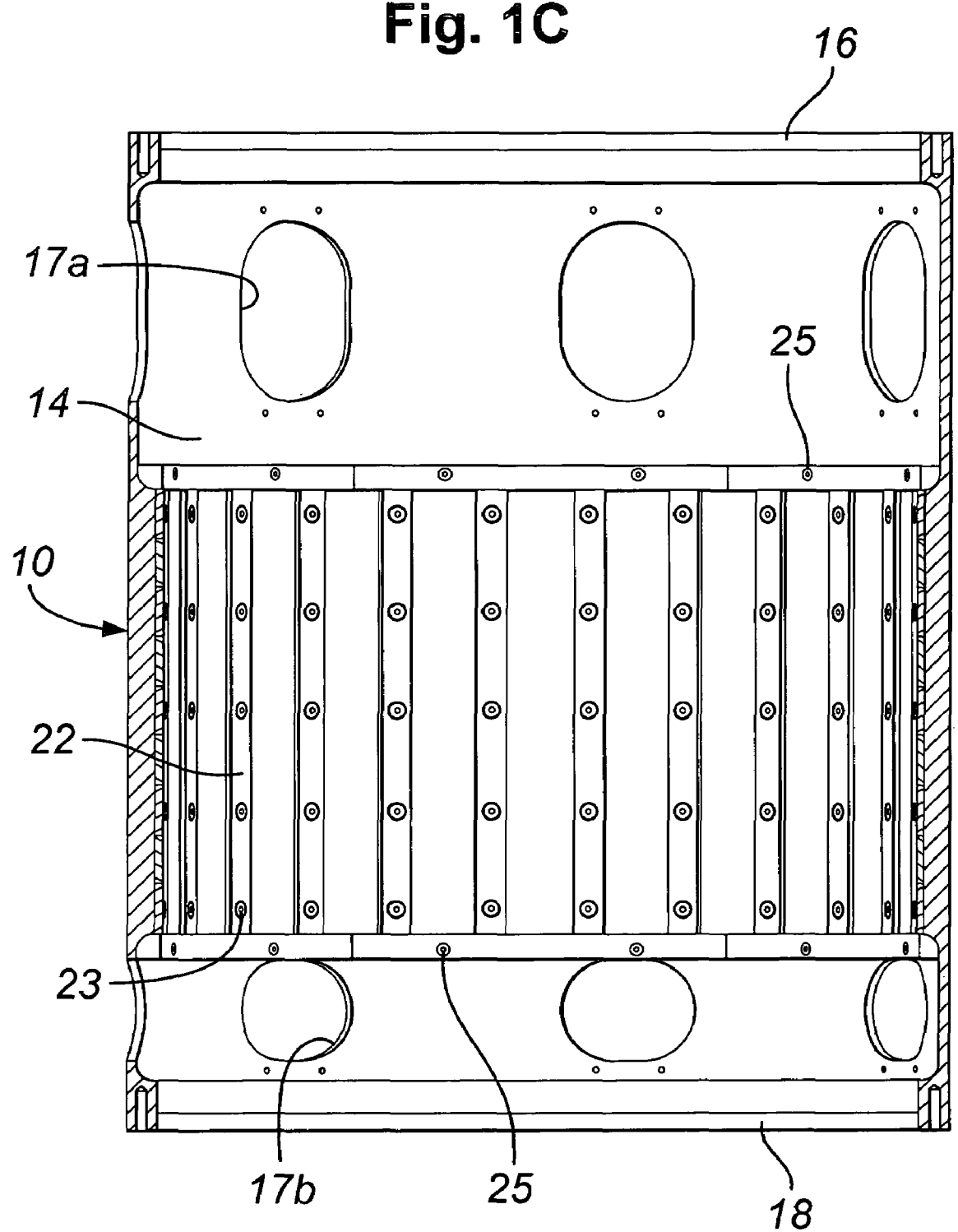

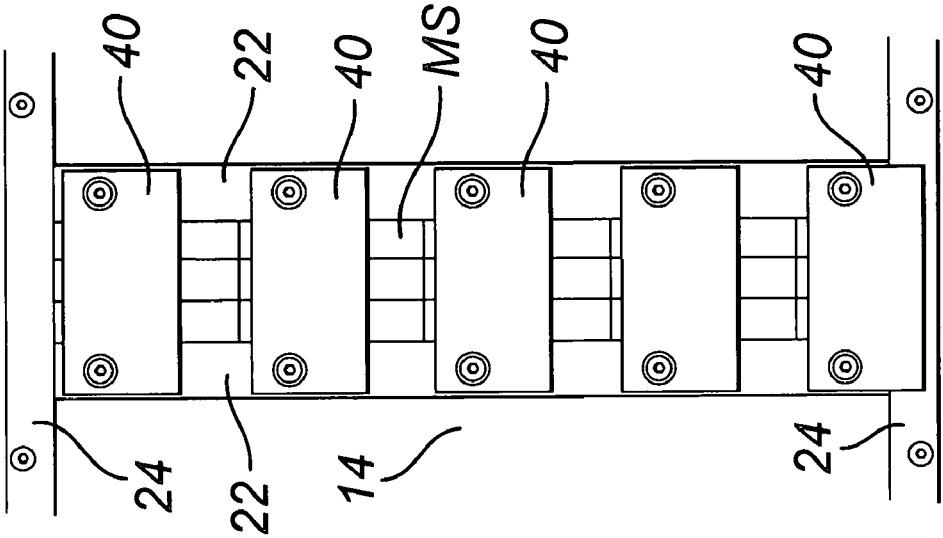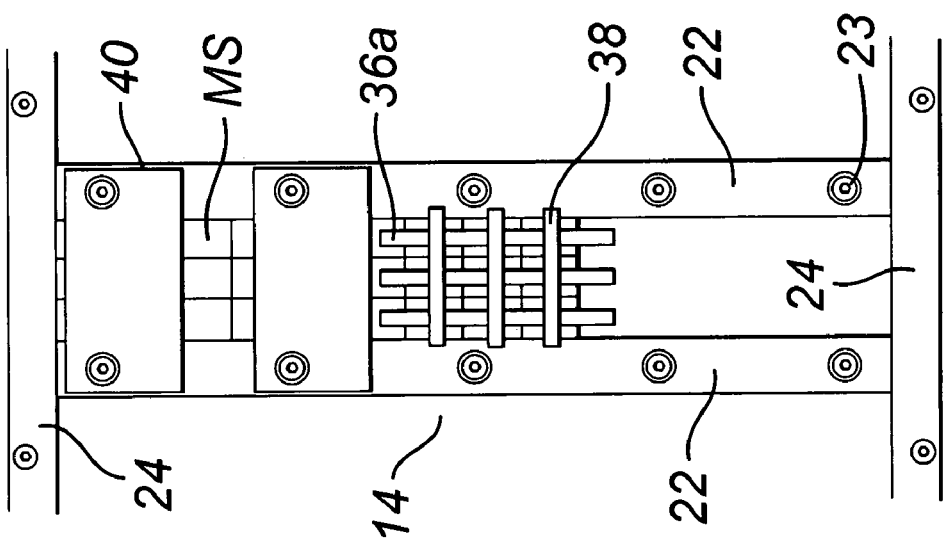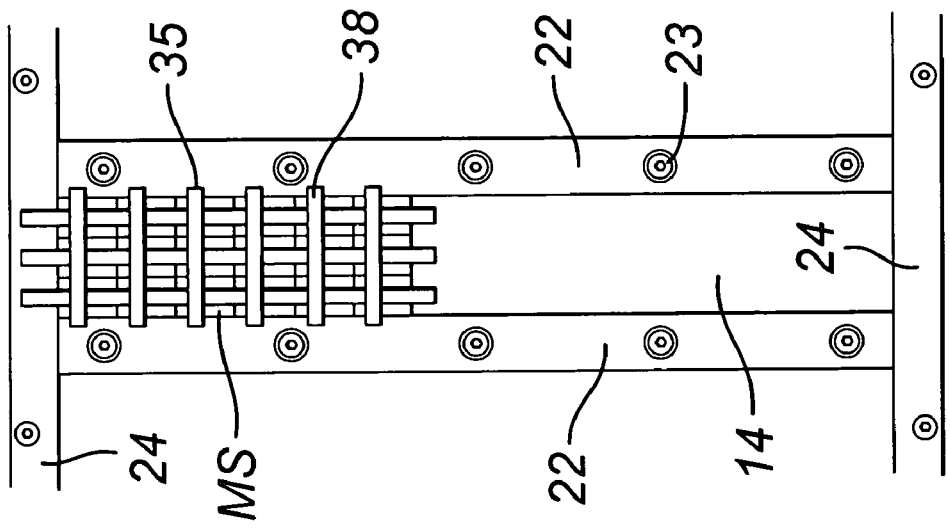

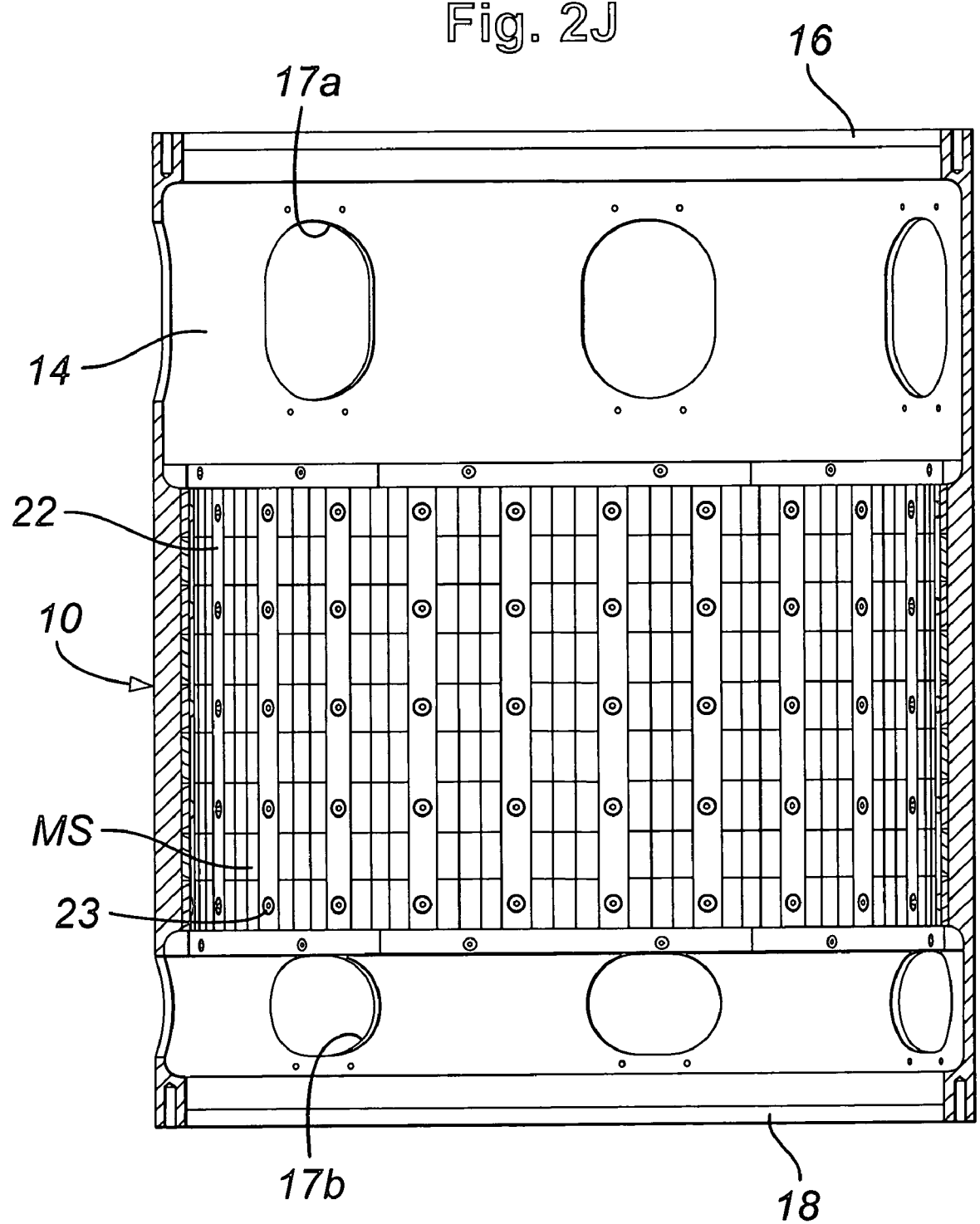

METHODS FOR MAKING ROTORS FOR PERMANENT MAGNET MOTORS

BACKGROUND OF THE INVENTION

1. Field of the Invention

This invention relates generally to rotors for permanent magnet motors, and, in certain particular aspects, to novel methods for making rotors for permanent magnet motors.

2. Description of Related Art

Rotors for certain known permanent magnet rotors are constructed of a generally cylindrical body, e.g. made of iron or ferrous material, which may be of a solid or sintered metal construction or may be a laminated core, and around which are positioned a plurality of magnets. The magnets can be flat, bar magnets or accurately shaped with a contour conforming to the surface of the body. The magnets are adhered to the body, e.g. with fasteners, connectors, or with adhesives.

The prior art discloses various motors and methods for retaining magnets while making a rotor (see, e.g. U.S. Patents and applications U.S. Pat. Nos. 6,703,746; 6,324,745; 5,578,885; 5,040,286; 4,959,577; 4,588,915; 4,339,874; 3,858,308; 3,531,670; 3,221,194; Ser. Nos. 09/952,319, 09/2001; 10/867,402, 06/2004; 10/552,120, 05/2003; all incorporated fully herein for all purposes). One known technique involves positioning magnetic elements around a core and applying a KEVLAR (trademark) or fiberglass wrap or other bonding material to hold the magnets in place. Often an adhesive filler is employed to fill voids and provide a rigid structure.

Another technique for retaining magnets on an associated core in a permanent magnet rotor includes wrapping a relatively fine wire, under tension, around the magnetic elements followed by an adhesive or epoxy coating to protect the wires and "pot" the assembly. Another technique employs a cylindrically shaped shell or "can" which is assembled around the outer peripheral surfaces of the magnets.

Another known technique provides machined or cast pockets on a rotor core to receive and retain magnets in fixed rotational relation on a rotor (see, for example, U.S. Pat. Nos. 4,549,341; 4,617,726; and 4,625,135). Other techniques for retaining magnets in fixed relation on rotor cores include providing mutually engaging flat surfaces on cores and magnets (see, e.g. U.S. Pat. Nos. 4,656,379; 4,631,435; and 4,633,113). Another technique employs wedge shaped magnets which are retained in relatively complex pockets or slots formed in a rotor (see. U.S. Pat. Nos. 4,332,079; 4,339,874; and 4,336,649). Other techniques which have been employed to secure magnets to rotors include the use of adhesives, (see, e.g., U.S. Pat. No. 3,531,670) and the use of a cast aluminum core (see, e.g. U.S. Pat. No. 4,088,177).

There has long been a need, recognized by the present inventor, for an efficient and effective method for emplacing permanent magnets on a rotor body and for maintaining the magnets in position during manufacture of a rotor until a permanent retention method is in place.

BRIEF SUMMARY OF THE INVENTION

The present invention, in certain aspects, discloses methods for making a rotor for a permanent magnet motor in which a plurality of magnets with adhesive thereon are emplaced on the rotor and held in position during various steps of the method. In certain particular aspects, magnet force of various magnets is shunted so that the tendency of magnets to move or separate due to like-pole repulsion and unlike-pole attraction is inhibited or minimized.

In certain embodiments of the present invention, movable shunts are provided that both shunt magnetic forces and hold magnets in position on a rotor body during assembly. In certain particular aspects, a grid of shunt pieces is use with some of the shunt pieces connected together and with other unconnected movable shunt pieces which are placed on other shunt pieces.

Accordingly, the present invention includes features and advantages which are believed to enable it to advance permanent magnet motor rotor assembly technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful, unique, efficient, non-obvious methods for making rotors for permanent magnet motors; and Such methods in which magnetic force of adjacent magnets is shunted to facilitate the maintenance of magnets' positions during rotor production.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later attempt to disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1C is a cross-section view of the rotor body of FIG. 1A illustrating a step in a method according to the present invention.

FIG. 2G is a partial view of the rotor body of FIG. 1C illustrating a step in a method according to the present invention.

FIG. 2H is a partial view of the rotor body of FIG. 1C illustrating a step in a method according to the present invention.

FIG. 2I is a cross-section view of a rotor body illustrating a step in a method according to the present invention.

FIG. 2J is an interior view of a rotor body illustrating a step in a method according to the present invention.

Figure 1A:
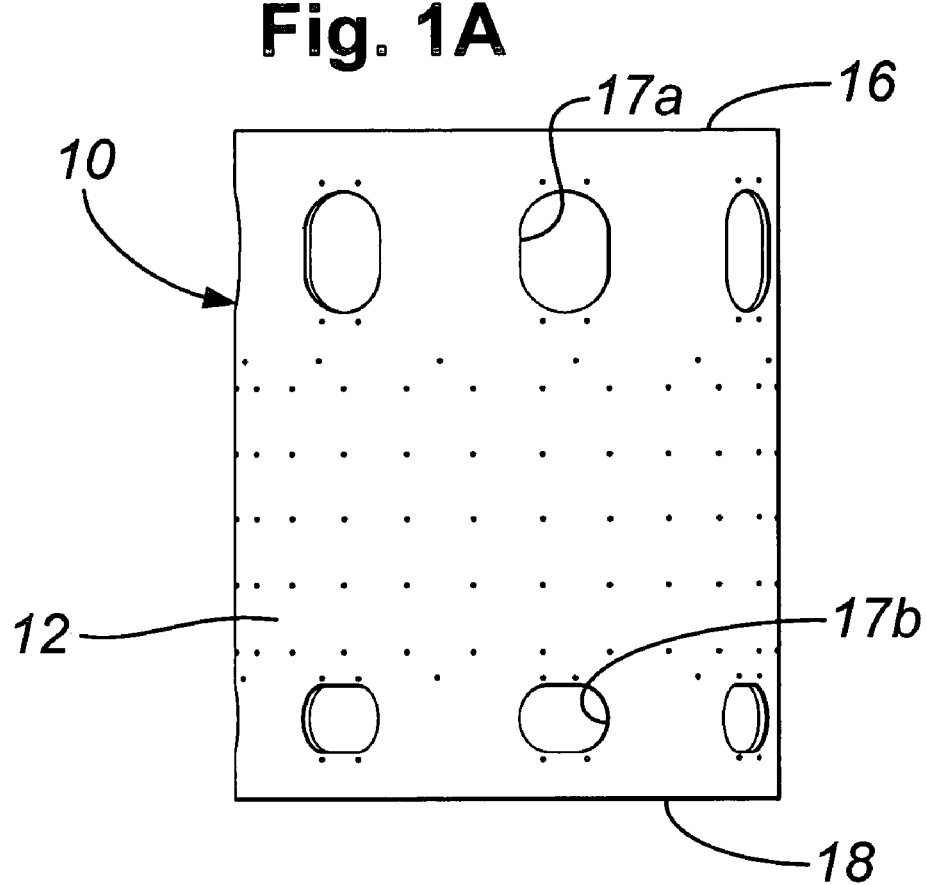
FIG. 1A is a side view of a rotor body for treatment according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference.

DETAILED DESCRIPTION OF THE INVENTION

Figure 1B:
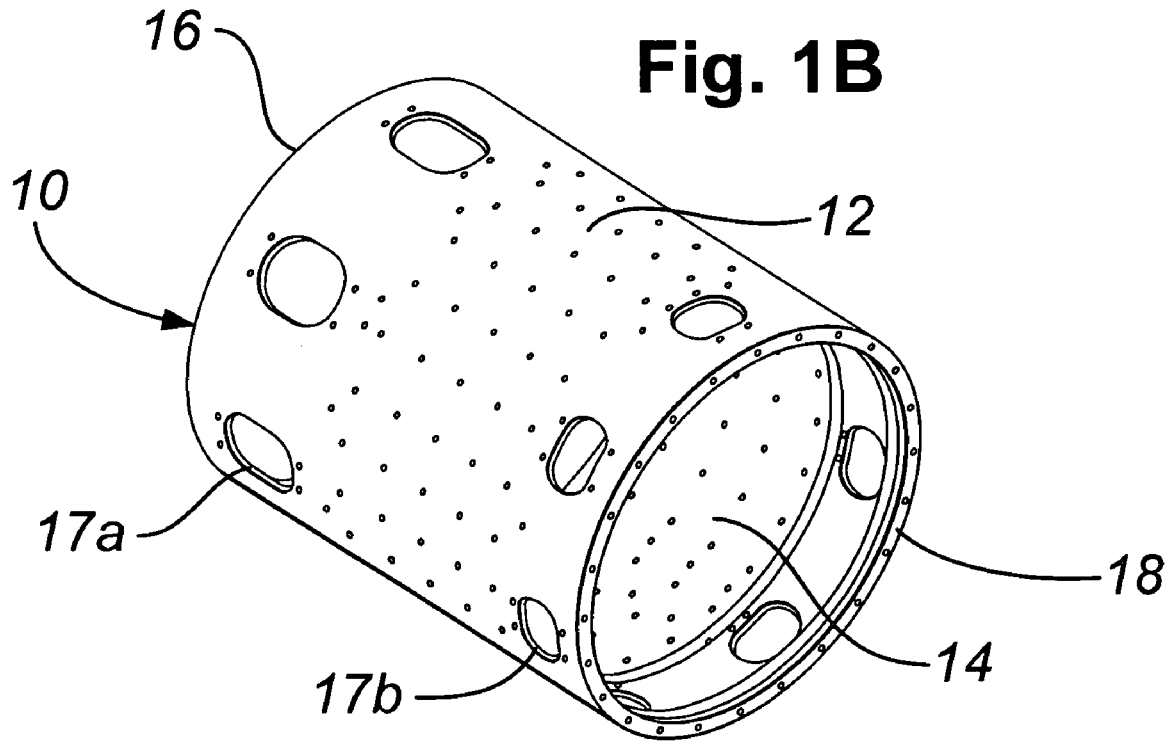
FIG. 1B is a perspective view of the rotor body of FIG. 1A.

FIGS. 1A-1C show a rotor body 10 to which magnets will be applied in methods according to the present invention. It is to be understood that the present invention is directed to methods for the application of magnets to a rotor and the scope of the invention includes any suitable rotor, including, but not limited to, the rotors of the drawings herein. The rotor body 10 is generally cylindrical with an exterior surface 12, a hollow interior with an interior surface 14, and spaced-apart ends 16 and 18. Optionally, cutouts 17a, 17b are provided for ventilation and installation of fan blades to move air through the rotor.

Following cleaning of the rotor body 10, a series of guides are connected to the interior surface 14. A plurality of guides 22 are placed longitudinally and bolted to the rotor body 10 with bolts 23. A plurality of end guides 24 are, optionally, placed in abutting relationship with the longitudinal guides 22 and bolted in place with bolts 25. In one aspect the guides are made from nonmagnetic material, e.g. plastic or fiberglass. The bolts are made of stainless steel or other nonmagnetic material.

Figure 2A:
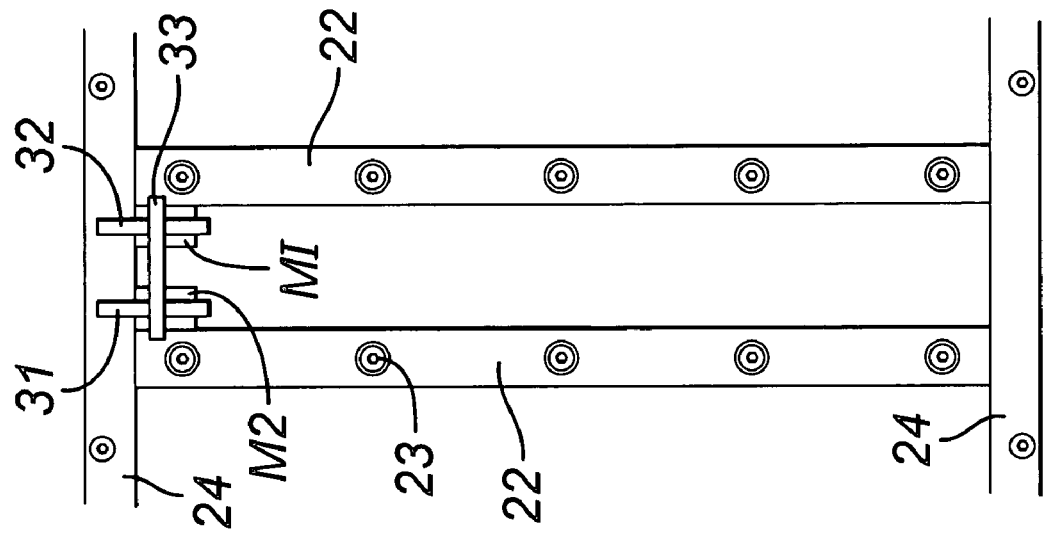
FIG. 2A is a partial view of the rotor body of FIG. 1C illustrating a step in a method according to the present invention.
Figure 2B:
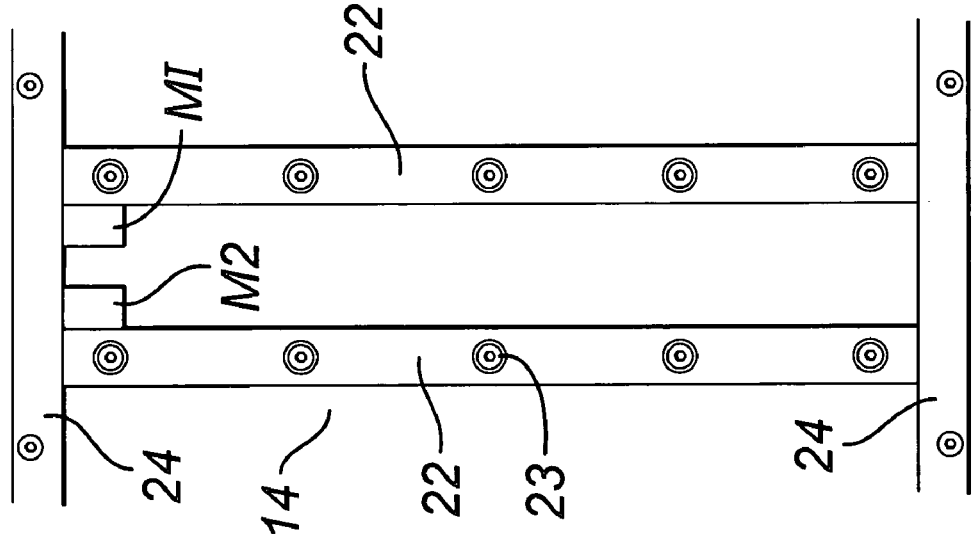
FIG. 2B is a partial view of the rotor body of FIG. 1C illustrating a step in a method according to the present invention.

As shown in FIG. 2A magnet application is begun by placing a first magnet MI in abutment against a longitudinal guide 22 and an end guide 24. Adhesive (to be cured) is applied to the bottom of the magnet to adhesively secure the magnet to the rotor body and to the sides of the magnet to adhesively secure adjacent magnets to each other. The magnet MI is magnetically attracted to the rotor body 10 and held in place with magnet force. As shown in FIG. 2B a second magnet M2 (with adhesive; as is the case with all magnets) is placed spaced-apart from the magnet MI and in abutment with a longitudinal guide 22 and an end guide 24. Then shunts, as described below, are put in place.

Figure 2C:
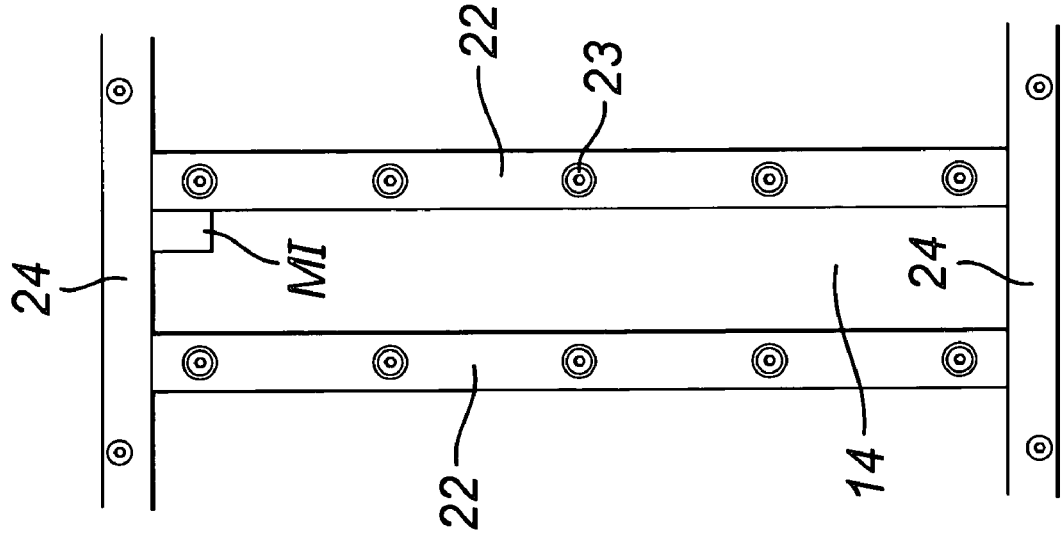
FIG. 2C is a partial view of the rotor body of FIG. 1C illustrating a step in a method according to the present invention.
Figure 2D:
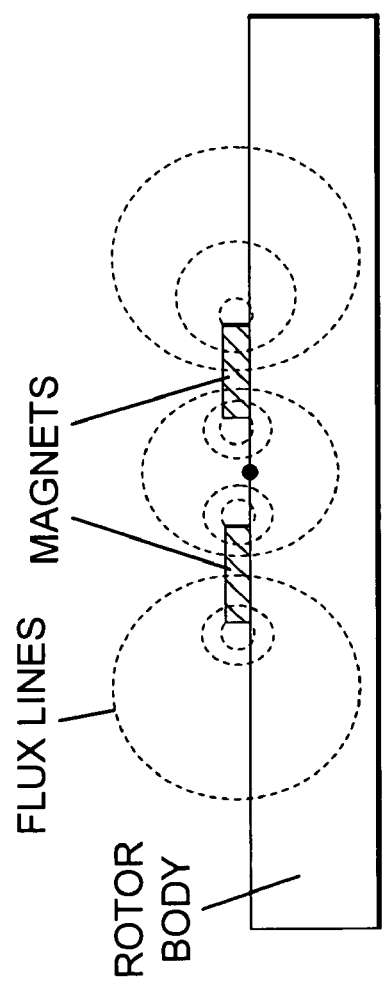
FIG. 2D is a cross-section view of the rotor body as shown in FIG. 2C.

FIG. 2D shows magnetic flux lines between two magnets placed on a rotor without using a shunt bar. The magnetic fields around the magnets inhibits placement and installation of additional magnets. A shunt structure 30, shown in FIG. 2C, has two spaced-apart bars 31, 32 joined together by a crossbar 33 which is connected to each bar 31, 32 (e.g., screwed, bolted, welded, glued). The bars 31-33 are made of magnetic material and magnetic attraction hold the bars together. As shown in FIG. 2E the shunt bars shunt (or redirect) magnetic lines of flux so that the tendency of like/unlike magnet poles of the magnets MI and M2 to repel each other is diminished. If this attraction/repulsion between magnets is not reduced, the magnets can move each other out of position. A bar/grid structure of nonmagnetic material may be used that holds the magnets in place after several rows of magnets are placed in position, e.g. a plastic, copper, or fiberglass (material that can stand baking temperatures, e.g. one hundred degrees or more C.) grid that clamps over two of the guides and prohibits magnet movement. In one aspect viewing the magnets as in FIGS. 2D and 2E, magnetic north poles are on the tops of the magnets and magnetic south poles are on the bottoms of the magnets (or vice versa) and lines of magnetic flux are shunted by the shunt members between south and north poles.

Figure 2F:
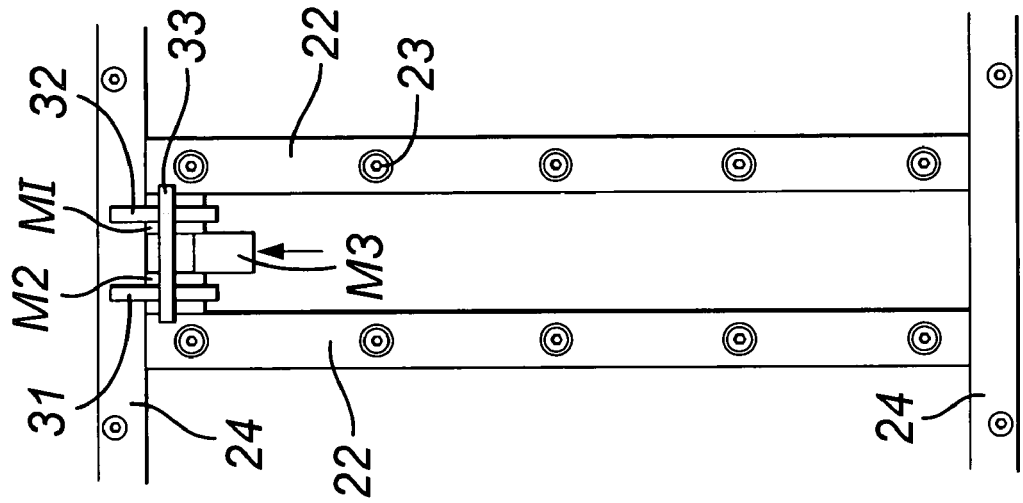
FIG. 2F is a partial view of the rotor body of FIG. 1C illustrating a step in a method according to the present invention.
Figure 2E:
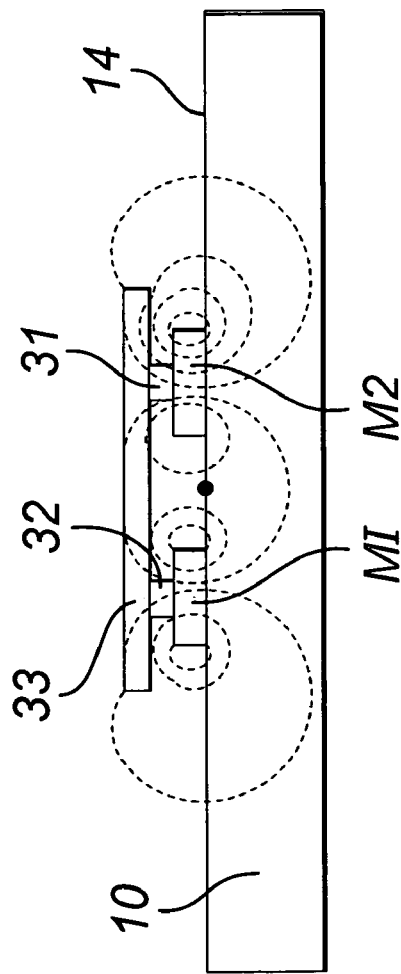
FIG. 2E is a cross-section view of the rotor body illustrating a step in a method according to the present invention.

As shown in FIG. 2F a third magnet M3 is emplaced between the magnets MI, M2 (shunt is in place). Once the magnet M3 is in place between the magnets MI, M2 and a plate 40 (see FIG. 2H) of nonmagnetic material (e.g. copper, plastic or wood) is placed as shown in FIG. 2F and, optionally, connected to the guides 22 in either side of the magnets. The plate 40 (and others around the interior surface 14 of the rotor body 10 once all magnets are in position), holds the magnets MI-M3 in position while the rotor body 10 with adhesive applied to the magnets is cured (as described below). Following curing and cooling, the plates 40 are removed.

FIG. 2G shows the use of shunt pieces 35 which are placed over magnets MS (eighteen shown) that are applied to the interior surface 14 of the rotor body 10.

FIG. 2H shows the progression of the application of magnets MS to the rotor body 10 with plates 40 holding in place completed series of applied magnets. Once the plates 40 are holding magnets in place, shunt structures used across them can be removed. As additional magnets are placed on the rotor body, cross bars 38 can be placed across shunt pieces 36a. The bars 38 are not connected to the shunt pieces. Optionally, bars 38 are connected to the shunt pieces.

FIG. 2I shows a rotor body 14 with magnets M (27 of them) installed on the surface 14 with plates 40 holding all the magnets M in place.

The thus-prepared rotor body 10 is placed in a heater oven and the bonding material is cured. The rotor body 10 is then removed from the heater oven and cooled.

Figure 2K:
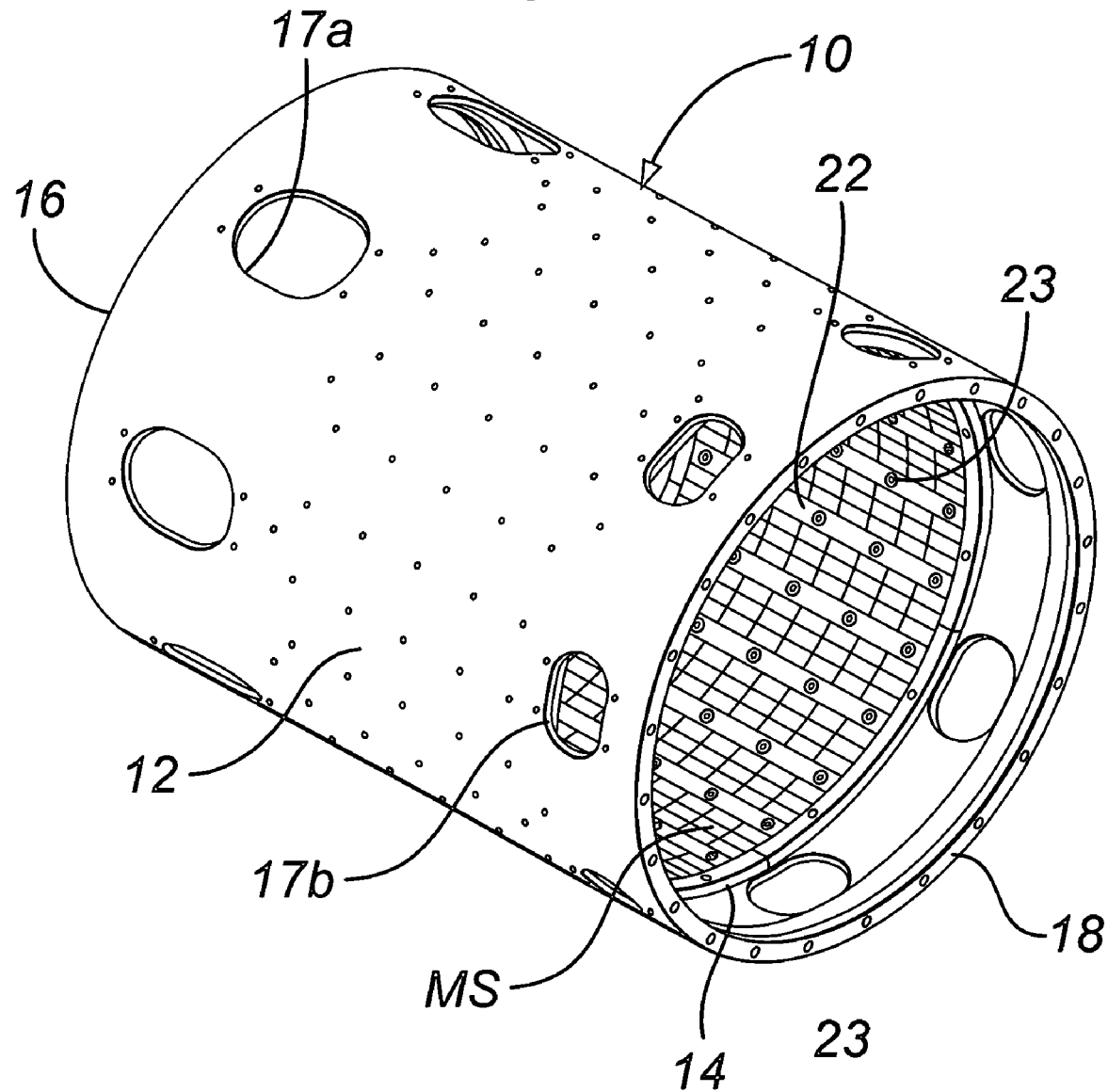
FIG. 2K is an end view of a rotor body made according to a method according to the present invention.

FIGS. 2J and 2K show the finished, cooled rotor body 10 with the magnets MS in place.

Multiple magnets placed adjacent each other act in effect as one large magnet with correspondingly large poles. For example, the magnets between two longitudinal guides, e.g. the magnets shown in FIG. 2I, can act as one large two-pole magnet (e.g. in one aspect a rotor according to the present invention has twenty-four of these multi-magnet-components large magnets).

The present invention, therefore, provides in some, but not in necessarily all, embodiments a method for making a rotor for a permanent magnet motor, the method including preparing a rotor body for emplacement of magnets thereon, the rotor body having a first end spaced-apart from a second end, the rotor body having a generally cylindrical shape with an interior surface and an exterior surface, the rotor body made of magnetic material; applying a plurality of magnets to the interior surface of the rotor body, the magnets held to the rotor body by magnetic force; and emplacing a shunt structure over the plurality of magnets to inhibit inter-magnet action. Such a method may have one or some, in any possible combination, of the following: connecting a series of a plurality of magnet guides to the rotor body, the guides spaced-apart and extending longitudinally of the rotor body, magnets of the plurality of magnets placed between the magnet guides; wherein the plurality of magnets includes at least a first magnet, a second magnet, and a third magnet, and the shunt structure includes a shunt bar, the method further including: placing the first magnet on the interior surface of the rotor body, placing the second magnet on the interior surface of the rotor body, placing the shunt bar on the first magnet and the second magnet, and placing the third magnet between the first magnet and the second magnet; wherein magnetic flux is associated with each magnet of the plurality of magnets, the method further including directing the magnetic flux of each magnet to facilitate placement of magnets on the rotor body; the plurality of magnets includes a plurality of individual magnets placed adjacent each other to form one large magnetic entity; placing a first end guide at the first end of the rotor body to facilitate magnet placement; and placing a second end guide at the second end of the rotor body to facilitate magnet placement; wherein the shunt structure comprises a plurality of shunt bars, each shunt bar across spaced-apart magnets; wherein the shunt structure comprises a grid of shunt bars extending across adjacent magnets; following emplacement of the plurality of magnets, removing the shunt bars, and placing at least one plate over the magnets to hold the magnets in position; applying magnet guides and magnets to a substantial portion of the interior surface of the rotor body; applying adhesive to the magnets to adhere the magnets to the rotor body and to each other; curing the adhesive; and/or following emplacement of the plurality of magnets, removing the shunt bars, placing at least one plate over the magnets to hold the magnets in position, and removing the at least one plate following curing of the adhesive.

The present invention, therefore, provides in some, but not in necessarily all, embodiments a method for making a rotor for a permanent magnet motor, the method including: connecting a series of a plurality of magnet guides to a rotor body, the rotor body having a first end spaced-apart from a second end, the guides spaced-apart and extending longitudinally of the rotor body, the rotor body having a generally cylindrical shape with an interior surface and an exterior surface, the rotor body made of magnetic material, applying a plurality of magnets to the interior surface of the rotor body between the magnet guides, the magnets held to the rotor body by magnetic force, emplacing a shunt structure over the plurality of magnets to inhibit inter-magnet action, placing a first end guide at the first end of the rotor body to facilitate magnet placement, placing a second end guide at the second end of the rotor body to facilitate magnet placement, wherein the shunt structure comprises a plurality of shunt bars, each shunt bar across spaced-apart magnets, following emplacement of the plurality of magnets, removing the shunt bars, placing at least one plate on the magnets to hold the magnets in position, applying magnet guides and magnets to a substantial portion of the interior surface of the rotor body, applying adhesive to the magnets to adhere the magnets to the rotor body and to each other, curing the adhesive, following emplacement of the plurality of magnets, removing the shunt bars, securing at least one plate on the magnets to hold the magnets in position, and removing the at least one plate following curing of the adhesive.

The present invention, therefore, provides in some, but not in necessarily all, embodiments a rotor made according to any method according to the present invention.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes.

What is claimed is:

1. A method for making a rotor for a permanent magnet motor, the method comprising preparing a rotor body for emplacement of magnets thereon, the rotor body having a first end spaced-apart from a second end, the rotor body having a generally cylindrical shape with an interior surface and an exterior surface, the rotor body made of magnetic material, applying a plurality of magnets to the interior surface of the rotor body, the magnets held to the rotor body by magnetic force, and emplacing a shunt structure over the plurality of magnets to inhibit inter-magnet action wherein the plurality of magnets includes at least a first magnet, a second magnet, and a third magnet, and the shunt structure includes a shunt bar, the method further comprising placing the first magnet on the interior surface of the rotor body, placing the second magnet on the interior surface of the rotor body, placing the shunt bar on the first magnet and the second magnet, and placing the third magnet between the first magnet and the second magnet.

2. The method of claim 1 further comprising connecting a series of a plurality of magnet guides to the rotor body, the guides spaced-apart and extending longitudinally of the rotor body magnets of the plurality of magnets placed between the magnet guides.

3. The method of claim 1 wherein magnetic flux is associated with each magnet of the plurality of magnets, the method further comprising directing the magnetic flux of each magnet to facilitate placement of magnets on the rotor body.

4. The method of claim 1 further comprising the plurality of magnets includes a plurality of individual magnets placed adjacent each other to form one large magnetic entity.

5. The method of claim 1 further comprising placing a first end guide at the first end of the rotor body to facilitate magnet placement, and placing a second end guide at the second end of the rotor body to facilitate magnet placement.

6. The method of claim 1 wherein the shunt structure comprises a plurality of shunt bars, each shunt bar across spaced-apart magnets.

7. A method for making a rotor for a permanent magnet motor, the method comprising preparing a rotor body for emplacement of magnets thereon, the rotor body having a first end spaced-apart from a second end, the rotor body having a generally cylindrical shape with an interior surface and an exterior surface, the rotor body made of magnetic material, applying a plurality of magnets to the interior surface of the rotor body, the magnets held to the rotor body by magnetic force, and emplacing a shunt structure over the plurality of magnets to inhibit inter-magnet action wherein the shunt structure comprises a grid of shunt bars extending across adjacent magnets.

8. The method of claim 7 further comprising following emplacement of the plurality of magnets, removing the shunt bars, and placing at least one plate over the magnets to hold the magnets in position.

9. The method of claim 7 further comprising applying magnet guides and magnets to a substantial portion of the interior surface of the rotor body.

10. The method of claim 1 further comprising applying adhesive to the magnets to adhere the magnets to the rotor body and to each other.

11. The method of claim 10 further comprising curing the adhesive.

12. The method of claim 11 further comprising following emplacement of the plurality of magnets, removing the shunt bars, placing at least one plate over the magnets to hold the magnets in position, and removing the at least one plate following curing of the adhesive.

* * * * *